US012670048B2

(12) United States Patent
Alspaugh et al.

(10) Patent No.: US 12,670,048 B2
(45) Date of Patent: Jun. 30, 2026

(54) SYSTEMS AND METHODS FOR RECOVERY STRATEGY CREATION, EVALUATION, AND RECOMMENDATION

(71) Applicant: JPMORGAN CHASE BANK, N.A., New York, NY (US)

(72) Inventors: Eric R Alspaugh, Lancaster, OH (US); Archana Ramesh, Bengaluru (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 12 days.

(21) Appl. No.: 18/805,012

(22) Filed: Aug. 14, 2024

(65) Prior Publication Data

US 2025/0390366 A1     Dec. 25, 2025

(30) Foreign Application Priority Data

Jun. 25, 2024     (IN) .............................. 202411048612

(51) Int. Cl.
*G06F 11/00*          (2006.01)
*G06F 11/07*          (2006.01)

(52) U.S. Cl.
CPC ........ *G06F 11/008* (2013.01); *G06F 11/0751* (2013.01); *G06F 11/079* (2013.01); *G06F 11/0793* (2013.01)

(58) Field of Classification Search
CPC .. G06F 11/008; G06F 11/0751; G06F 11/079; G06F 11/0793

USPC ........................................................ 714/1–57
See application file for complete search history.

(56) References Cited

U.S. PATENT DOCUMENTS

| | | | | |
|---|---|---|---|---|
| 9,842,034 B2 * | 12/2017 | Heliker | .................... | G06N 5/02 |
| 2003/0233613 A1 * | 12/2003 | Ash | ...................... | G06F 11/1666 714/799 |
| 2010/0281307 A1 * | 11/2010 | Ng | ......................... | G06F 11/079 714/49 |
| 2021/0049452 A1 * | 2/2021 | Fan | ....................... | G06N 3/0455 |
| 2023/0132501 A1 * | 5/2023 | Phillippe | .............. | G06F 11/0769 714/38.1 |
| 2024/0281818 A1 * | 8/2024 | Golestan Irani | ... | G06Q 20/4016 |

* cited by examiner

*Primary Examiner* — Sarai E Butler
(74) *Attorney, Agent, or Firm* — GREENBERG TRAURIG LLP

(57) ABSTRACT

In some aspects, the techniques described herein relate to a method comprising determining an event associated with a threshold probability of causing inaccessibility to an asset; retrieving, by a model executed by a processor and from a database, event data; determining, from a database of a plurality of assets, a set of assets affected by the event based on the event data; generating cause synthetic data related to the event for the set of assets to determine a category for the event based on a location of the event; generating effect synthetic data related to the event for the set of assets; generating a recovery strategy including a response detail based on the cause synthetic data and the effect synthetic data for each asset; generating a risk profile including the response detail for each asset and a probability of the event; and calculating a degree of risk.

11 Claims, 8 Drawing Sheets

100

200

400

410

600

SYSTEMS AND METHODS FOR RECOVERY STRATEGY CREATION, EVALUATION, AND RECOMMENDATION

RELATED APPLICATIONS

This application claims priority to, and the benefit of, Indian Patent Application number 202411048612, filed Aug. 25, 2024, the disclosure of which is hereby incorporated, by reference, in its entirety.

BACKGROUND

1. Field of the Invention

Aspects generally relate to systems and methods for a generative model to generate, improve, and implement recovery strategies.

2. Description of the Related Art

Significant progress has been made in the field of generative machine learning (ML) models. Many of these models such as large language models (LLMs) are based on neural networks and deep learning models such as transformer-based models. For instance, generative pre-trained transformer models and platforms have been refined to the point where output is not only coherent but can address nuanced instructions. One such instruction is a request for generation of source code that accomplishes a particular task or builds all or part of a computer program.

Current generative ML models are deficient in being able to provide accurate predictions and thus plan for appropriate responses to adverse incidents. While models such as LLMs can address a number of issues, these models are not built for organizational challenges stemming from incidents that negatively impact supply chains, work sites, staff, and allocation of assets. Improved models can address these issues by determining and vetting recovery strategies. Improved models can also be automated to provide recovery strategies and quantify and elevate visibility of risk of assets and recovery strategies. Improved models can identify severe but plausible scenarios and identify points of vulnerability, including if multiple assets are disrupted simultaneously.

SUMMARY

In some aspects, the techniques described herein relate to a method comprising: determining an event associated with a threshold probability of causing inaccessibility to an asset; retrieving, by a model executed by a processor and from a database, event data; determining, from a database of a plurality of assets, a set of assets affected by the event based on the event data; generating cause synthetic data related to the event for the set of assets to determine a category for the event based on a location of the event; generating effect synthetic data related to the event for the set of assets to determine a first order impact and a second order impact; generating a recovery strategy including a response detail based on the cause synthetic data and the effect synthetic data for each asset; generating a risk profile associated with the generated recovery strategy including the response detail for each asset and a probability of the event; and calculating a degree of risk for the response detail.

In some aspects, the event data may include one or more of an event category, a nature, a location, a scale, a duration, a season, or a time of day. In some aspects, the cause synthetic data may be generated using a generative adversarial network including inputs of past event data and a probabilistic time series model to a generator of the generative adversarial network, wherein the generative adversarial network determines whether the generated event data meets a threshold metric based on comparison to actual event data. In some aspects, the effect synthetic data may be generated using a generative adversarial network including inputs of a mix of the set of assets and a probabilistic time series model to a generator of the generative adversarial network, wherein the generative adversarial network determines whether the generated event data meets a threshold metric based on comparison to actual complex asset disruption data. In some aspects, the recovery strategy may be generated using a generative adversarial network including inputs of the cause synthetic data and the effect synthetic data to a generator of the generative adversarial network, wherein the generative adversarial network determines whether the recovery detail meets a threshold metric of recovery of an asset of the set of assets, where in the asset of the set of assets is impacted by the event. In some aspects, the method may include generating, with a retrieval augment generation model, chunks based on the recovery strategy. In some aspects, the method may include combining the chunks with a query to construct a prompt. In some aspects, the method may include generating the cause synthetic data or the effect synthetic data comprises generating a chaotic event.

In some aspects, the method may further comprise querying through the prompt systematically to recommend one or more ways for determining the response detail for the recovery strategy using a combination of parameters. In some aspects, the method may further comprise querying through the prompt systematically to recommend one or more ways for determining the response detail for the recovery strategy using a confidence score. In some aspects, the method may further comprise enacting the response by allocating an asset to the response detail. In some aspects, the method may further comprise based on the allocation, contacting an asset with a task related to the response detail.

DETAILED DESCRIPTION

This disclosure generally relates to systems and methods for a generative model including recovery strategy creation, evaluation, and recommendation.

When creating a platform including infrastructure for an application to execute on, software engineers go through a tedious process of iterative refinement of ideas, working prototypes, and production fixes. This can involve a host of tasks and sub-tasks such as determining an application structure, determining relevant application programming interface (API) calls, defining testing models and protocols, and data identification, to name only a few. Embodiments consistent with this disclosure may automate these and other development tasks by providing methods for model generation, iteration, and/or testing.

Embodiments consistent with this disclosure, methods may include a software platform or model. Methods may generate a model for recovery strategy creation, evaluation, and recommendation.

Models consistent with this disclosure may include one or more steps of creating synthetic data for plausible disruptive events, creating synthetic data for complex asset disruptive events, evaluating, reinforcing, and creating evaluating strategies based on the synthetic data and generative adversarial network (GAN) models and probabilistic time series, querying and retraining the model and calculating a degree of risk associated with the plausible disruptive events and/or complex asset disruptive events. Methods can include generating the model.

In accordance with aspects, a processor executing instructions stored on memory may access a database for data to create synthetic data.

Figure 1:
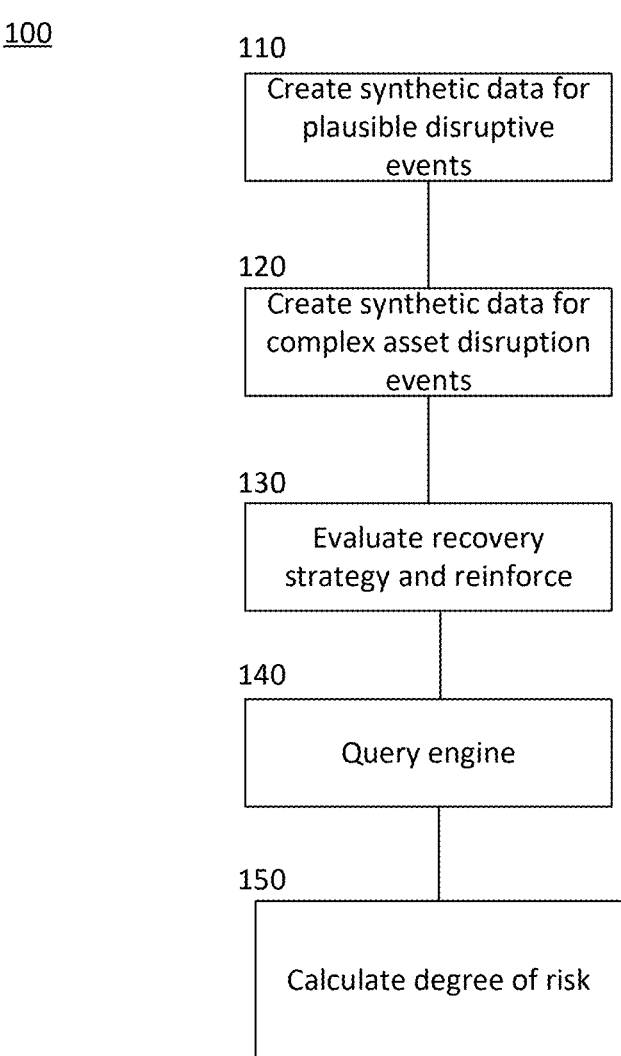
FIG. 1 is a logical flow of a generative platform, in accordance with aspects.

FIG. 1 is a logical flow of a generative platform, in accordance with aspects. Block diagram 100 includes steps creating synthetic data 110 for plausible disruptive events (PDEs); creating synthetic data 120 for complex asset disruption (CADs) events; evaluating, reinforcing, and creating recovery strategies 130; querying and retraining the model 140; and calculating a degree of risk 150 associated with the plausible disruptive events and/or complex asset disruption events.

Step 110 can include creating the "cause" of a resiliency event. Databases may be mined, including internal and external, for resiliency events and information pertaining to resiliency events. Such information may include a threat index, environmental, concentration, risk estimation, and public/government data sources. Information may be categorized as one or more of an event, an event category, a nature, a location, a scale of an event, a duration, a season, a time of day, and an average time.

Examples of PDEs include a natural disaster, a power outage, a telecommunications/internet outage, a terrorist attack, a civil unrest or conflict event, a pandemic/epidemic, a people management issue, a facility management issue, a technology process failure, a cyber/malware attack, a data center outage, a data corruption or error event, a third party process failure, and a market infrastructure outage. PDEs may be categories by type, including whether the PDE is geographic (e.g., confined to a particular location/geography) or universal (e.g., can be experienced anywhere in the system).

Step 110 can include identifying related individual asset mix of a recovery plan associated with the relevant PDEs. Step 110 can include receiving a recovery plan and determining assets likely to be affected and/or critical to a response. Assets may include staff and/or staff for a site (e.g., buildings, capabilities), staff and/or staff for an application, applications, third party organizations that can assist, external market infrastructure, business developed tooling, and technology assets (e.g., physical devices, telephony, websites, network drives). Assets that are used to support recovery threshold can be target recovery operating level (TROL) assets. Assets that are critical to supporting essential or critical services can be critical point of failure (CPOF) assets.

Step 110 can include creating a database of PDEs that are applicable to a specific asset or asset mix.

A model associated with step 110 can include a generative adversarial network with a generator model and a discriminator model. The model will be discussed further below with regards to FIG. 2 and FIG. 4.

Step 120 can include creating the "effect" of the resiliency event. Step 120 can include determining CAD events. Step 120 can include determining what assets are unavailable for a period related to an identified PDE. Step 120 can be assets that are available but impeded. Thousands of combinations of unavailable assets may be generated for related PDEs. Different periods of time related to PDEs may be evaluated to determine what assets become available during different times of the PDE or PDEs. A risk profile can be generated including these time periods and unavailable assets for the related PDE. CAD events can extend to degrees of both plan and asset dependencies representing a lineage of impacted assets to evaluate.

Step 120 can include collecting information pertaining to CAD events. Step 120 can include determining further assets and/or dependencies related to a recovery plan. For example, dependencies for steps of recovery strategies, and their relevant impact across all degrees of relationships that could be impacted by the PDE can be determined to understand the scope of the impact of the PDE. Step 120 can include business process information including dependencies of the assets, system access, and/or operating procedures. Impacts on these dependencies can be analyzed.

Examples of CADs include determining whether assets are affected by the PDEs. CADs may include one or more of staff, sites, third party assets/applications/support, market infrastructure, technology, or data. For these examples, the CADs may be an extended disruption of a single CPOF asset. Other examples of CADs include effects of the PDEs on a geographic concentration or in more than one location (e.g., more than one city). For these examples, the CADs may be a simultaneous disruption of multiple CPOF assets.

The combination of steps 110 and 120 can create "severe but plausible" scenarios. Steps 110 and 120 can include using chaos engineering to simulate/test availability of an application, a network, a staff, a site, a market infrastructure, a user tool, or other assets and services discussed herein, in case a PDE or CADs (e.g., an outage) occurs so that the asset can be safely moved to other assets, for example, in another region/another data center/an availability zone. This will help to create events which can be used in synthetic data creation utilizing GAN for crafting PDEs/CADs. For example, chaos engineering can include adding variability to PDEs/CADs to mimic real-life situations.

A model associated with step 120 can include a generative adversarial network with a generator model and a discriminator model. The model will be discussed further below with regards to FIG. 3 and FIG. 4.

Step 130 can include determining whether an identified recovery plan addresses needs for a service or persons to conduct the service for each identified "severe but plausible events" generated from step 120. Further, step 130 includes testing the identified recovery plan against the potentially thousands of combinations of CAD events identified in step 120. Step 130 includes analyzing the dependencies.

Dependencies can include one or more of complexity of the recovery plan; time to implement a particular recovery plan; cost; interdependencies between one or more of a recovery plan, a staff, a site, an application, a market infrastructure, and a user tool; a legal and/or compliance requirement; one or more of a plan to service dependencies, service to service dependencies, and plan to plan dependencies; and asset mixes generated from CAD events. Assets generated from CAD events may include business side recovery, an asset side dependency, how a CAD event may apply, each application and/or each application that supports a primary application that a plan relies on, a third party utility that a building relies on, a party that a business partner relies on, an inter affiliate service provider impacted across a plan dependency. Improvements can be obtained by analyzing not only each asset but the interrelated assets supporting an identified asset critical to a plan.

In some embodiments, the plan may be evaluated against metrics like average time to achieve TROL, TROL, recovery time objective (RTO), recovery point objective (RPO), maximum time to default (MTD), and maximum tolerable level of disruption (MTLD).

In some embodiments, a recommendation engine searches a database of past responses or options for response and determines an applicable recommendation. In some embodiments, a recommendation engine can perform reinforced learning through its past results through rewards and penalties as will be discussed further related to FIG. 6.

A model associated with step 130 can include a generative adversarial network with a generator model and a discriminator model. The model will be discussed further below with regards to FIG. 5.

The model can be used to both try to break the plans (containing assets and recovery strategies) and use the strategies in different combinations to address the PDE. First, the output can be recommendations for missing strategies for asset mixes that other plans have identified or that work under differing conditions. Second, a model of success or failure (e.g., measured by metrics) is produced across outage conditions (risk profiles) and responses. Third, the model can then be utilized to model the most effective way (among thousands of options) to recover in a complex environment.

Step 140 can include querying a set of PDE or CAD event inputs systematically and generating in real time to determine an optimal recovery plan of a plurality of possible plans. Inputs can include systematic driven or through human input and query. The determination can be one or more of recovery strategies, timeframes, recovery steps, or procedural order for a large population of impacts and with all relevant dependencies for each strategy. The measure of the optimal recovery plan may be determined by one or more of the metrics discussed herein. In some embodiments, an incident decision may be generated to support an ongoing recovery plan or possible recovery plan. Step 140 may implement a retrieval augmentation generation model.

Step 140 can include a self-learning generative artificial intelligence LLM. Step 140 can include querying through a prompt systematically to recommend one or multiple ways for determining a response for the recovery plan using a combination of parameters and/or a confidence score. The response or response detail can include an allocation of assets (e.g., buildings, groups, third parties, services). The response detail can include determining a method of contacting those assets (e.g., SMS, automated phone call, e-mail). The response detail can include an explanation of the situation (e.g., PDE or CAD) and/or a task to undertake related to the situation (e.g., PDE or CAD) in the communication to personal of those assets. The response detail can include verification that the recipient assets (e.g., personnel, third parties, building systems, emergency services) are working and/or that they can respond as tasked. The verification can include determining a verification from a response (e.g., SMS, voice, e-mail) and logging the response. The response detail can be further incorporated into a recovery strategy as a successful allocation of assets or unsuccessful, which can lead to further identification, appointment, and contact of assets.

A model associated with step 140 can include a generative adversarial network with a generator model and a discriminator model. The model will be discussed further below with regards to FIG. 7.

Step 150 can include an estimation of the risk of the proposed response from step 140. The estimated risk of a single recovery plan may be rolled up with other estimated risks of other recovery plans. A risk profile may be identified with the highest score risk or the most commonly identified asset and related proposed responses. The proposed response or responses may be generated and potentially actioned by systems implementing code associated with the response. For example, the response may include calling a group of employees to fill in for another group that is unable to access their materials or virtual workspaces in the case of an internet outage (e.g., caused by a storm, local or widespread event, power disruption). Step 150 can include recommending a risk or risks that would need to be raised against particular plan elements as needed (e.g., against the plan, against the asset, against the process).

In some embodiments, a predictive ML model can utilize multiple nodal scenarios to calculate a degree of risk and use a recommendation model to recommend an associated risk level, a concern, and an issue to be raised to resiliency and asset provider teams.

Figure 2:
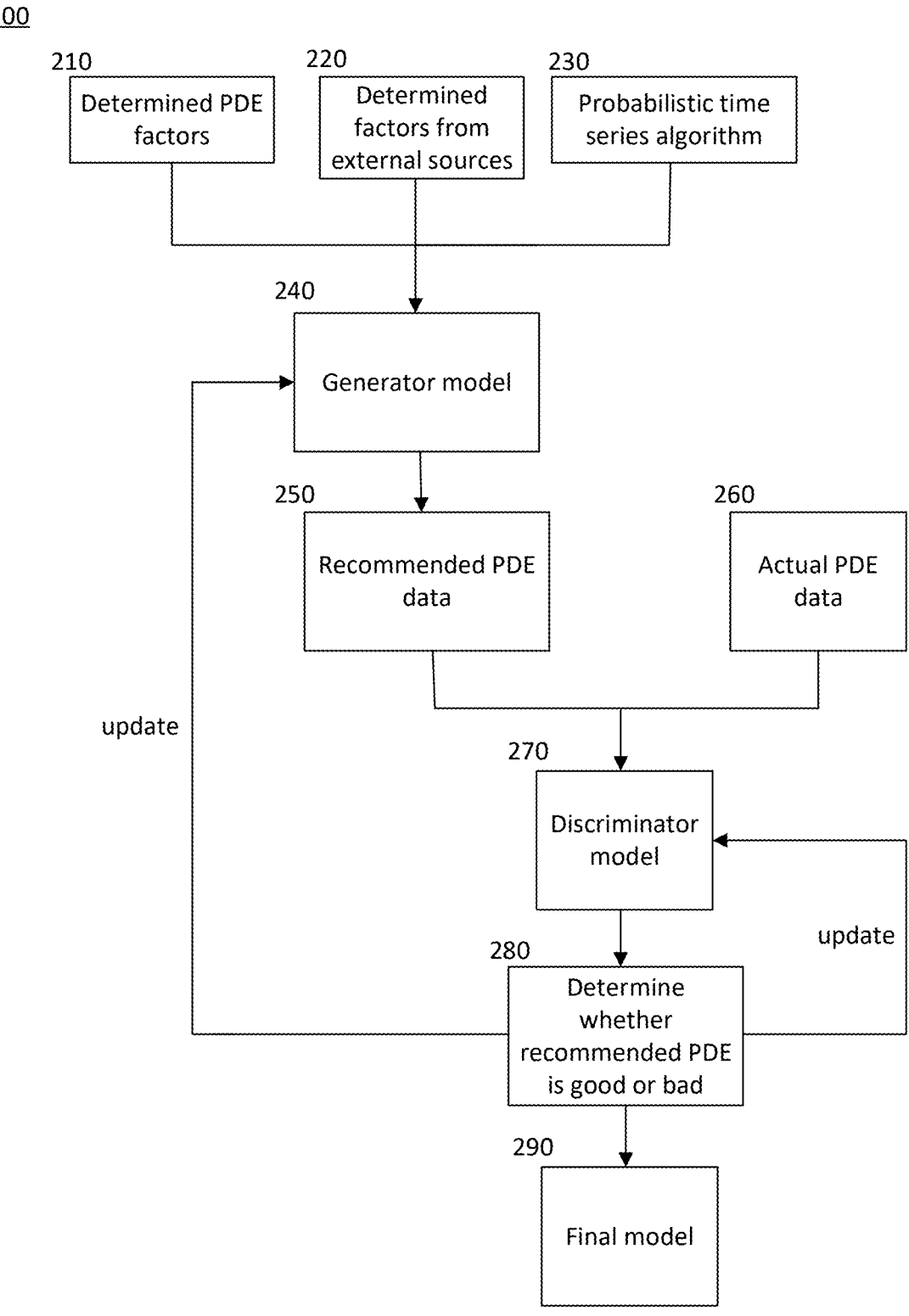
FIG. 2 is a logical flow of a generative platform, in accordance with aspects.

FIG. 2 is a logical flow of a generative platform, in accordance with aspects.

Logical flow 200 may include step 210 of determining PDE factors or using existing PDE factors. Determining PDE factors may include determining factors critical to an asset or service based on factors repeatedly being a point of failure in past PDE response analyses. Logical flow 200 may include step 220 of determining factors and/or retrieving information related to factors from external data sources consistent with disclosed embodiments. Data from steps 210 and 220 may be organized in pre-defined categories consistent with the present disclosure or generated based on commonalities in the data.

Next, step 230 may include creating probabilistic time-series models to analyze past events data and/or a history of event to create new PDEs with the same impact, time, and/or nature, a probability/confidence score percentage, and a forecasted complex assets disruptions with probabilities that the CADs or underlying events will take place. The probability/confidence score percentage may be based on a number of similar events that occur over a period of time. Step 230 may include an estimation of an impact based on previous examples and include a range of impacts on assets related to the PDE event.

Next, step 240 may include using data from determined PDE factors and external sources to generate and train a generator model to generate PDEs.

Next step 250 may include selecting recommended PDEs based on one or more metrics consistent with the present disclosure. The metrics may be used to rate a PDE. PDEs with a lowest aggregate score (e.g., lowest risk) may be selected and passed on to a discriminator model.

It is noted that a combination of events that have not previously occurred and will not be captured by the probabilistic timeseries models will be added by chaos engineering inputs. Chaos engineering inputs will be applied to simulate and/or test an availability of assets in case a PDE occurs so that the asset can be transferred consistent with disclosed embodiments. The creation of synthetic PDEs based on chaos engineering will assist in determining the extent and impact of outages on assets for the PDEs.

The GAN model used for steps FIG. 2 include identifying that the true recovery strategy will involve the discriminator to function in a unknown-unknown cluster, where all required parameters and even the number of required parameters is unknown. Further, the GAN model will consider whether the combinations of existing parameters will be used to determine if a recovery plan is efficient or achieves a desired result (e.g., normalcy, minimum operation) based on analysis of a large and otherwise unresolvable number of PDE factor combinations.

Given an event, the model will be capable of picking/choosing/assembling the right combination of parameters from millions of raw/synthetically engineered parameters available in a corpus (created in previous steps) and devise a customized resiliency plan. Furthermore, recovery strategies are custom developed using the exact same principles and could devise an ML-driven recommendation engine to propose top-n recovery plans for the event.

Next, step 270 may include a discriminator model where the recommended PDE is compared against an actual PDE, generated consistent with the present disclosure, to see if the combination can exist. If so, step 280 results in a determination of whether the PDE is acceptable (e.g., the combination can exist) or if the PDE is unacceptable (e.g., the combination cannot exist). As discussed further herein, the resulting outcome (good/bad) can be used to update, train, and/or refine the PDE generator and discriminator models.

Next, step 290 uses the good PDEs in a final model as will be discussed further herein.

Figure 3:
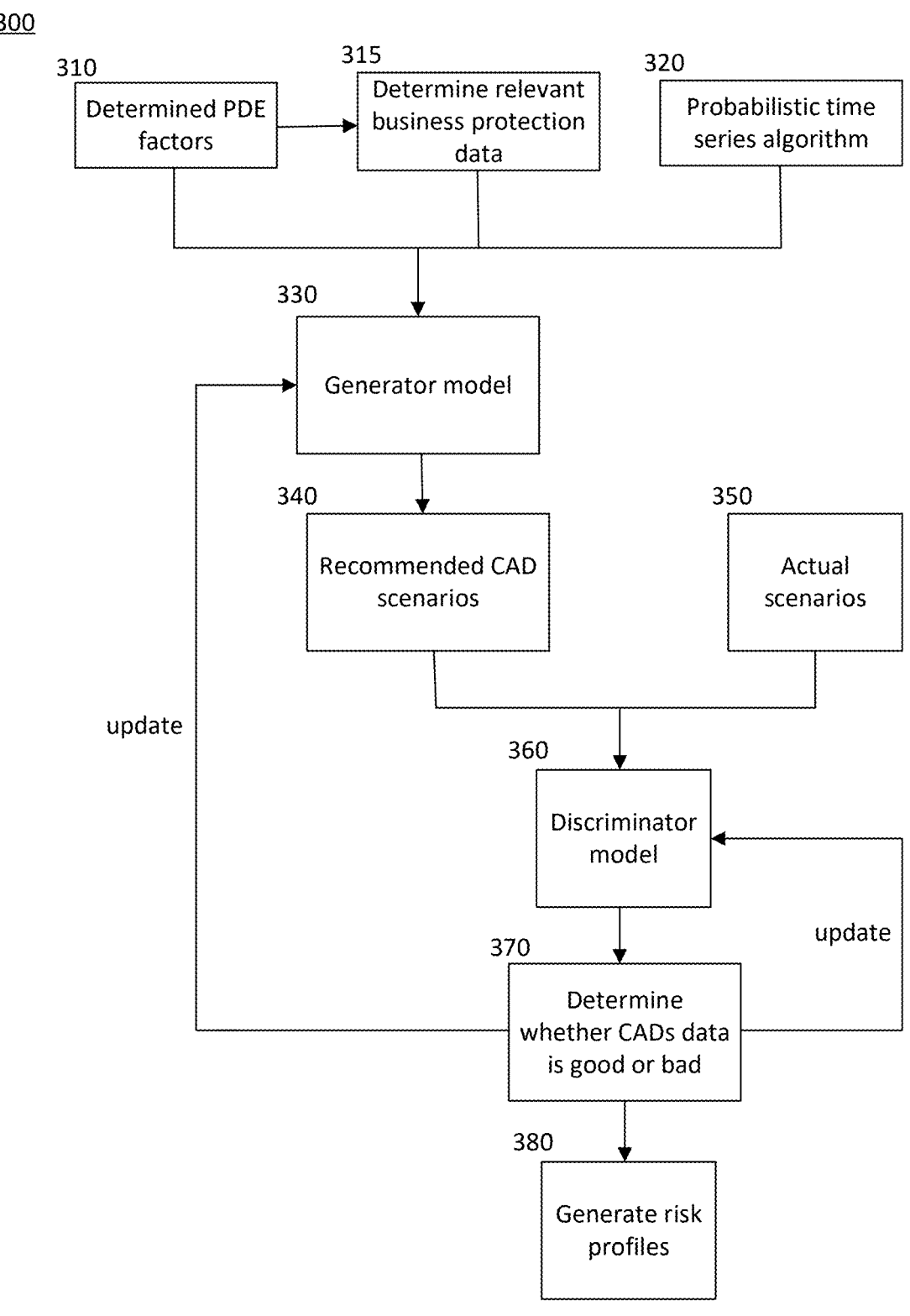
FIG. 3 is a logical flow of a generative platform, in accordance with aspects.

FIG. 3 is a logical flow of a generative platform, in accordance with aspects.

Logical flow 300 may include step 310 of receiving determined PDE factors from previous steps (e.g., from FIG. 2 or step 110 in FIG. 1).

Next, step 315 may include determining business process information related to the determined PDE factors. The relevant business process information can be standard operating procedures, system access, staff roles, and/or building access.

Next, step 320 may include creating probabilistic timeseries models to analyze past events data and/or a history of event to create new CADs with the same impact, time, and/or nature, a probability/confidence score percentage, and a forecasted complex assets disruptions with probabilities that the CADs or underlying events will take place. The probability/confidence score percentage may be based on a number of similar events that occur over a period of time. Step 320 may include an estimation of an impact based on previous examples and include a range of impacts on assets related to the PDE event.

Next, step 330 may include using data from determined CAD factors to generate and train a generator model to generate CADs. The CADs can include a list of effects on assets that can be affected by the determined PDEs.

Next step 340 may include selecting recommended CADs based on one or more metrics consistent with the present disclosure. The metrics may be used to rate a CAD. CADs with a lowest aggregate score (e.g., lowest risk) may be selected and passed on to a discriminator model.

Next step 350 may include selecting recommended PDEs based on one or more metrics consistent with the present disclosure. The metrics may be used to rate a PDE. PDEs with a lowest aggregate score (e.g., lowest risk) may be selected and passed on to a discriminator model.

It is noted that a combination of events that have not previously occurred and will not be captured by the probabilistic timeseries models will be added by chaos engineering inputs. Chaos engineering inputs will be applied to simulate and/or test an availability of assets in case a PDE occurs so that the asset can be transferred consistent with disclosed embodiments. The creation of synthetic PDEs based on chaos engineering will assist in determining the extent and impact of outages on assets for the PDEs.

The GAN model used for steps FIG. 2 include identifying that the true recovery strategy will involve the discriminator to function in an unknown-unknown cluster, where all required parameters and even the number of required parameters is unknown. Further, the GAN model will consider whether the combinations of existing parameters will be used to determine if a recovery plan is efficient or achieves a desired result (e.g., normalcy, minimum operation) based on analysis of a large and otherwise unresolvable number of PDE factor combinations.

Given an event, the model will be capable of picking/choosing/assembling the right combination of parameters from millions of raw/synthetically engineered parameters available in a corpus (created in previous steps) and device a customized resiliency plan. Furthermore, recovery strategies are custom developed using the exact same principles and could devise an ML-driven recommendation engine to propose top-n recovery plans for the event.

Next, step 360 may include a discriminator model where the recommended CAD is compared against an actual CAD, generated consistent with the present disclosure, to see if the combination can exist. If so, step 370 results in a determination of whether the CAD is acceptable (e.g., the combination can exist) or if the CAD is unacceptable (e.g., the combination cannot exist). As discussed further herein, the resulting outcome (good/bad) can be used to update, train, and/or refine the CAD generator and discriminator models.

Next, step 380 uses CADs determined to be acceptable to form a risk profile. This can be for multiple Severe But Plausible Events. Consistent with disclosed embodiments, the risk profile can include a list of affects (e.g., disruptions) of assets. The risk profile can categorize affects as extended disruptions of a single CPOF asset or simultaneous disruption of multiple CPOF assets. The risk profile can include categorizing affects on assets as direct impacts (i.e., first order impacts) or second or third order impacts. In some embodiments, impacts on assets, categorizations, and orders of impacts may be mapped on a grid.

For example, if a natural disaster triggers a power outage, the primary affects on assets for the first order can be listed as well as the secondary affects on assets for the second order due to the power outage. As another example, if an internal technology process failure includes an internet connection failure for a financial service provider, then market infrastructure may be compromised for the financial market, affecting a number of employees, buildings, and other assets. As another example, a third party process failure such as ineffective change control might disrupt a CPOF application that it hosts for a financial institution and thus cause critical data to be lost. As another example, a geomagnetic storm causes a city-wide power outage that disrupts a concentration of CPOF assets including third party operations, sites with critical staff, and potential ability for staff elsewhere (e.g., travelling or at home) to be affected. As another example, a widespread protest movement may disrupt CPOF staff and sites including access to sites in multiple locations. As another example, a cyber attack may disrupt data centers hosting multiple CPOF applications (internal use and/or external, for customers) used for critical processes.

Figure 4:
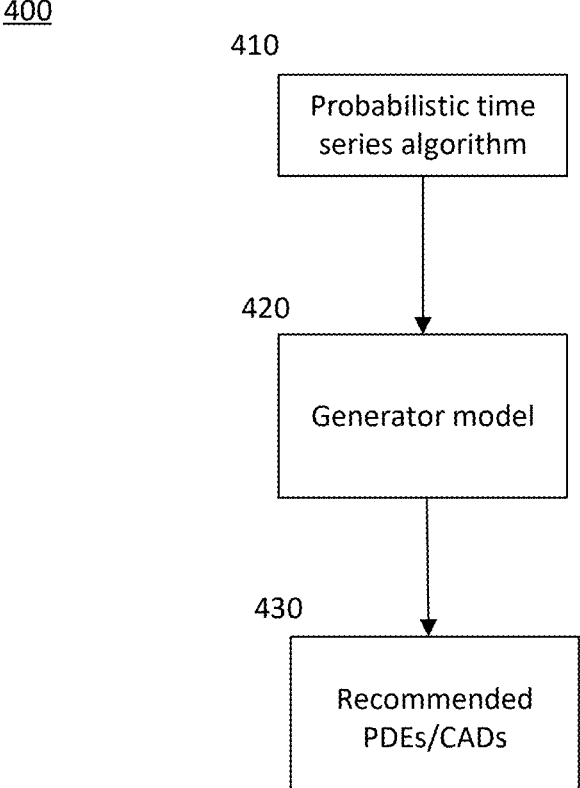
FIG. 4 is a logical flow of a generative platform, in accordance with aspects.

FIG. 4 is a logical flow of a generative platform, in accordance with aspects.

Logical flow 400 may include step 410 of determining one or more of an event, event category, nature, scale, location, duration, season, and business process information of a past event, such as for a PDE or CAD. Step 420 may include using a model and creating new CADs or PDEs with the same impact, time, and/or nature, a probability/confidence score percentage, and a forecasted complex assets disruptions with probabilities that the PDEs or CADs or underlying events will take place. The probability/confidence score percentage may be based on a number of similar events that occur over a period of time. Step 420 may include an estimation of an impact based on previous examples and include a range of impacts on assets related to the PDE event. Determining PDE factors may include determining factors critical to an asset or service based on factors repeatedly being a point of failure in past PDE response analyses.

Figure 5:
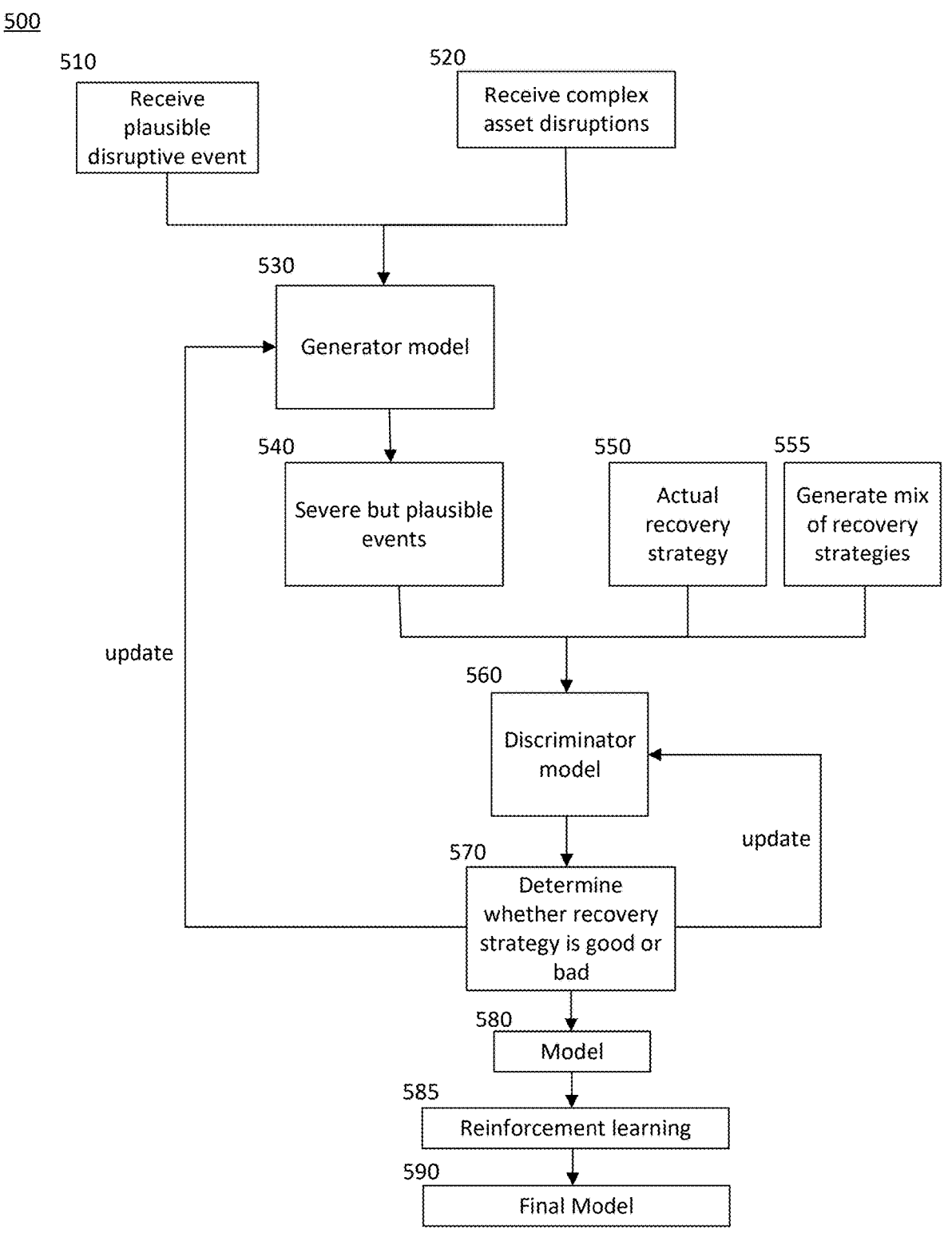
FIG. 5 is a logical flow of a generative platform, in accordance with aspects.

Logical flow 400 may include step 430 of outputting CADs or PDEs with the same impact, time, and/or nature, a probability/confidence score percentage, and a forecasted complex assets disruptions with probabilities that the PDEs or CADs or underlying events will take place FIG. 5 is a logical flow of a generative platform, in accordance with aspects.

Logical flow 500 may include steps 510 and/or 520 of receiving a PDE and CADs consistent with the present disclosure. In some embodiments, the PDE and/or CAD may be selected at random.

Next, step 530 may include using data from determined PDEs and CADs to generate and train a generator model to generate severe but plausible events.

Next step 540 may include selecting recommended severe but plausible events based on one or more metrics consistent with the present disclosure. The metrics may be used to rate a PDE. PDEs with a lowest aggregate score (e.g., lowest risk) may be selected and passed on to a discriminator model.

Next step 550 may include retrieving an actual recovery strategy that was previously used for comparison to a proposed recovery strategy. Similarly, step 555 may include generating a mix of recovery strategies. Some recovery strategies may be generated based on assets or support related to those assets (e.g., third party or internal personnel or services to fix or maintain issues associated with particular assets). Some recovery strategies may be generated based on asset mixes, interdependencies between a recovery plan, a staff, a site, an application, a market infrastructure, and a user tool. Recovery strategies can include metrics associated with recovery of a particular asset (e.g., TROL, RTO, MTD, MVTD).

Next, step 560 may include a discriminator model that determines whether a recovery strategy from steps 550, 555 sufficiently addresses the identified severe but plausible event from step 540. The determination of addressing the severe but plausible event can be made at an asset level or by categorization. The determination can be made based on a threshold of certain metrics (TROL, RTO, MTD, MTLD). The determination could be, as a few examples, Loss of Site—use work from home capability; Loss of Staff—transfer the work to a different group; Loss of Third Party-utilize another party who is unaffected by the PDE. Combinations of recovery strategies can be used.

Once, step 570 results in a determination of whether the recovery strategy is acceptable (e.g., severe but plausible event affects are addressed or metrics are met) or if the recovery strategy is unacceptable (e.g., severe but plausible event affects are not addressed or one or more metrics are not met). As discussed further herein, the resulting outcome (good/bad) can be used to update, train, and/or refine the recovery strategy generator and discriminator models.

Next, steps 580, 585, 590 uses the good CADs to form a risk profile. Consistent with disclosed embodiments, the risk profile can include a list of affects (e.g., disruptions) of assets. The risk profile can categorize affects as extended disruptions of a single CPOF asset or simultaneous disruption of multiple CPOF assets. The risk profile can include categorizing effects on assets as direct impacts (i.e., first order impacts) or second or third order impacts. In some embodiments, impacts on assets, categorizations, and orders of impacts may be mapped on a grid.

Figure 6:
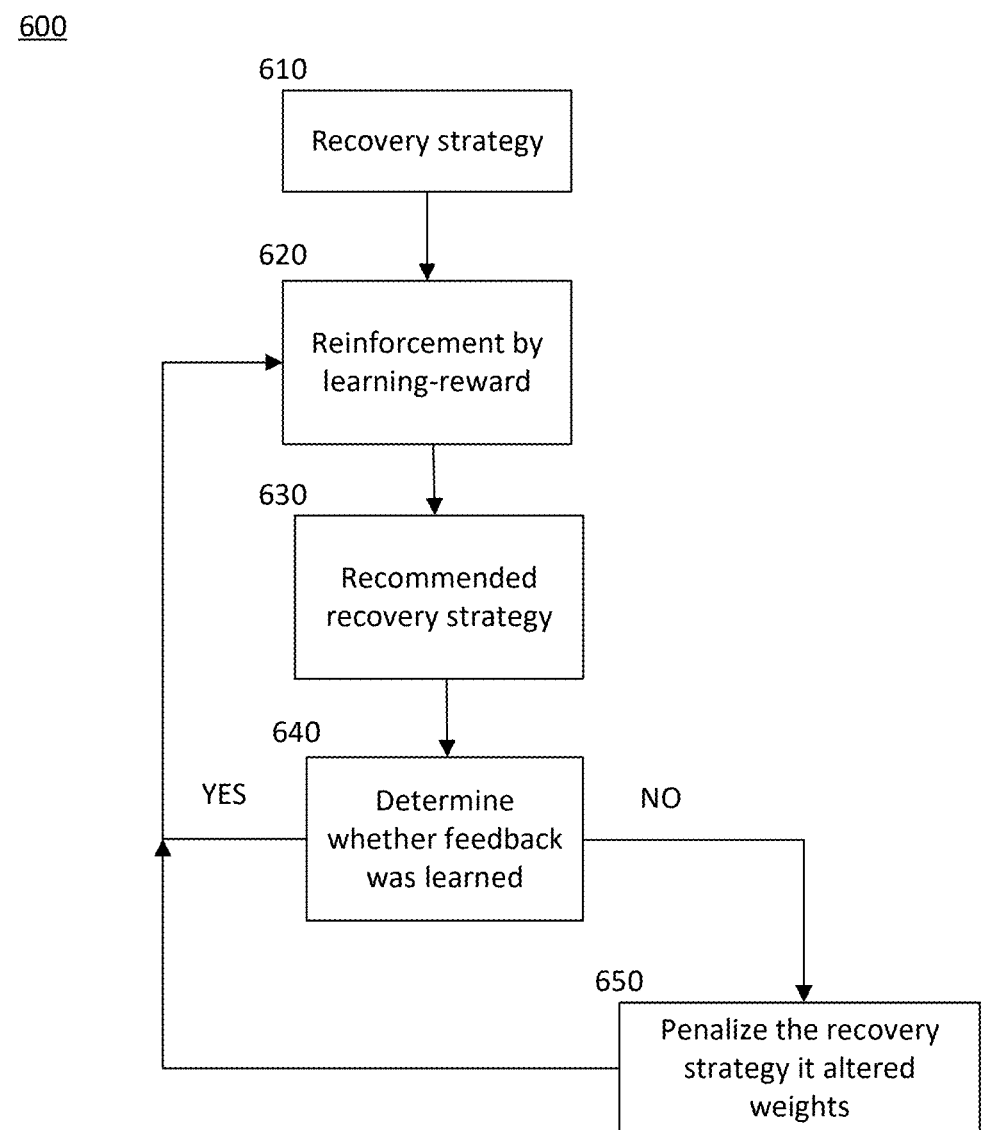
FIG. 6 is a logical flow of a generative platform, in accordance with aspects.

FIG. 6 is a logical flow of a generative platform, in accordance with aspects.

Logical flow 600 may include step 610 of receiving recovery strategies from FIG. 5. Next, step 620 can include reinforcement by rewarding a correct result so the model can be motivated to look for similar results. In the case where it is the first iteration, step 620 can be skipped. Next, step 630 includes identifying a recommended recovery strategy based on the application of metrics consistent with the disclosure herein. Next, step 640 includes determining whether the recommended recovery strategy is sufficient, for example by application of metrics to a threshold or based on a user rejection. If the recommended recovery strategy is insufficient, the recovery strategy can be penalized in step 650 by altering a negative weight to the recovery strategy or a particular response of the recovery strategy before it is passed back to step 620. If the recommended recovery strategy is sufficient, the recovery strategy can be rewarded by sending the recovery strategy through another iteration. Further, weights may be adjusted to prioritize similar recovery strategies or particular responses of other recovery strategies. The application of metrics could be comparison to operating levels set within the TROL and time set within the RTO and MTD supporting the MTLD.

Figure 7:
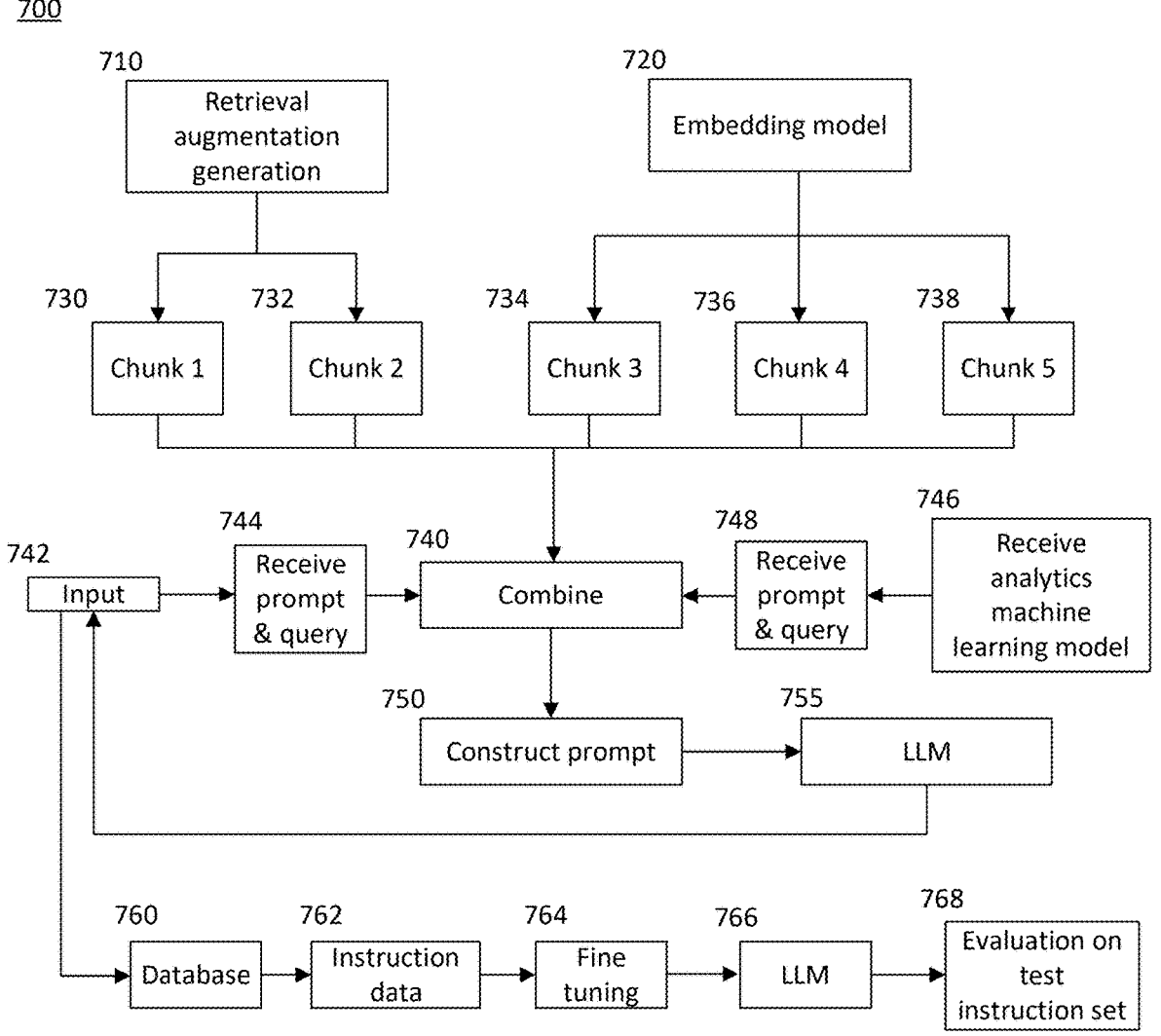
FIG. 7 is a block diagram of a generative platform, in accordance with aspects.

FIG. 7 is a block diagram of a generative platform, in accordance with aspects.

Logical flow 700 may include model 710 capable of retrieving a recovery strategy (e.g., from FIG. 5) and generating chunks 730, 732 from the recovery strategy. Model 710 can generate chunks based on a database with Retrieval Augmentation Generation. Similarly, embedding model 720 can be capable of retrieving an LLM embedding model and generating chunks 734, 736, 738.

In model 740, chunks from both the retrieval augmentation generation and the embedding model may be combined. Further, the chunks can be associated with a query or prompt 744, 748 from an iterative input generator 742 or an analytics machine learning model 746. As an example, the iterative input generator 742 can request a recovery strategy for a particular asset and/or for a particular event including through a number of listed assets or events. In some embodiments, the iterative input generator 742 can be replaced with a user.

In model 750, a prompt can be constructed based on the combination of chunks, the prompt, and the query. The model 750 can use the retrieved relevant documents as context with the prompt and query and send them to the LLM to generate a response.

In model 755, the language learning model can generate the response based on the prompt. The result may be fed back to the iterative input generator 742 so a decision can be made on the next input (e.g., the next asset, a similar asset, a similar event) as it iteratively progresses through assets/events.

Iterative input generator 742 may store its results in a database 760. The language learning model of 755 may use the database 762 for future determinations including using a list of rules, instructions, and/or weights in the database 760. of determining PDE factors or using existing PDE factors. Language learning model of 755 may fine tune rules, instructions, and/or weights based on a reward/penalty system consistent with FIG. 6 as needed according to model 764. A new LLM may be generated for model 766. The LLM may be evaluated based on a test instruction set 768. If superior results are reached, the LLM may replace the LLM of model 755.

Figure 8:
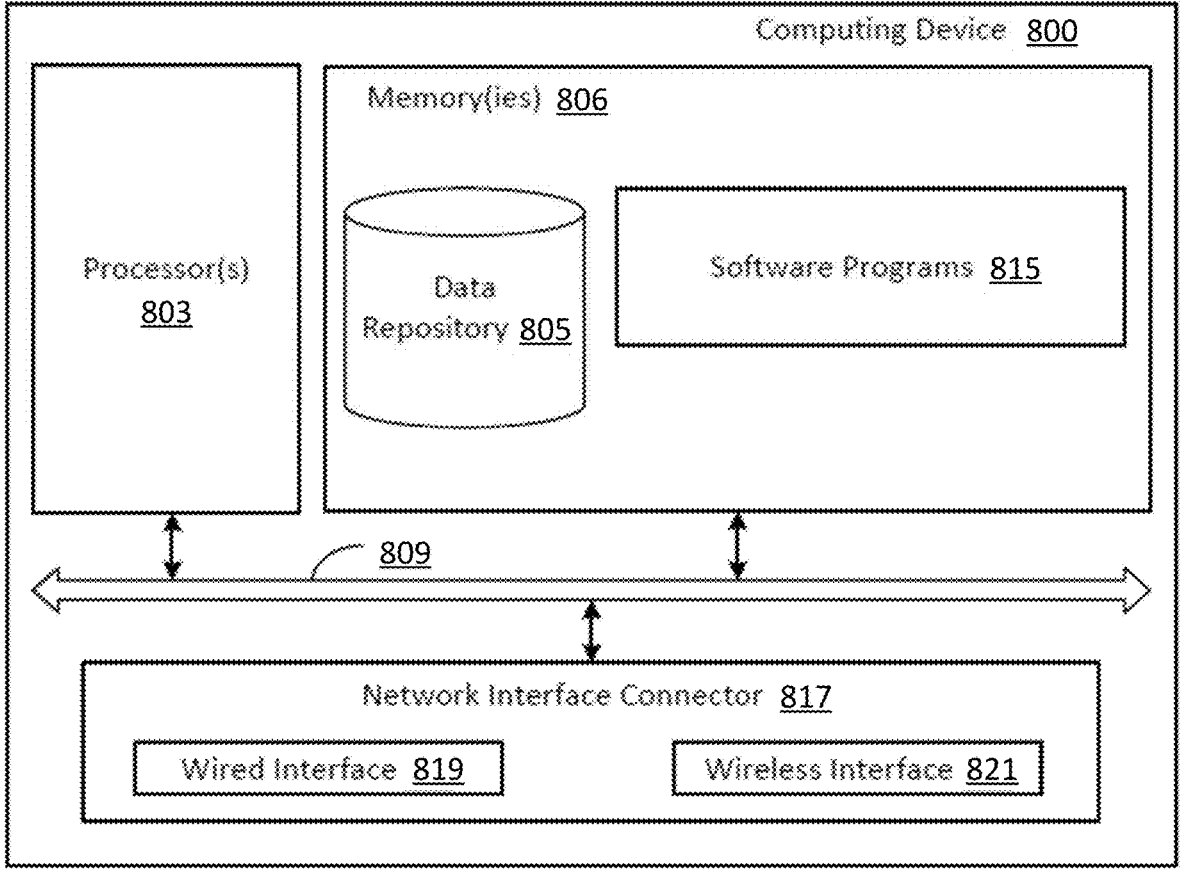
FIG. 8 is a block diagram of a computing device for implementing certain aspects of the present disclosure.

FIG. 8 is a block diagram of a computing device for implementing certain aspects of the present disclosure. FIG. 8 depicts exemplary computing device 800. Computing device 800 may represent hardware that executes the logic that drives the various system components described herein. For example, system components such as a various software engines, a ML model engine, an interface, various database engines and database servers, and other computer applications and logic may include, and/or execute on, components and configurations like, or similar to, computing device 800.

Computing device 800 includes a processor 803 coupled to a memory 806. Memory 806 may include volatile memory and/or persistent memory. The processor 803 executes computer-executable program code stored in memory 806, such as software programs 815. Software programs 815 may include one or more of the logical steps disclosed herein as a programmatic instruction, which can be executed by processor 803. Memory 806 may also include data repository 805, which may be nonvolatile memory for data persistence. The processor 803 and the memory 806 may be coupled by a bus 809. In some examples, the bus 809 may also be coupled to one or more network interface connectors 817, such as wired network interface 819, and/or wireless network interface 821. Computing device 800 may also have user interface components, such as a screen for displaying graphical user interfaces and receiving input from the user, a mouse, a keyboard and/or other input/output components (not shown).

The various processing steps, logical steps, and/or data flows depicted in the figures and described in greater detail herein may be accomplished using some or all of the system components also described herein. In some implementations, the described logical steps may be performed in different sequences and various steps may be omitted. Additional steps may be performed along with some, or all of the steps shown in the depicted logical flow diagrams. Some steps may be performed simultaneously. Accordingly, the logical flows illustrated in the figures and described in greater detail herein are meant to be exemplary and, as such, should not be viewed as limiting. These logical flows may be implemented in the form of executable instructions stored on a machine-readable storage medium and executed by a processor and/or in the form of statically or dynamically programmed electronic circuitry.

The system of the invention or portions of the system of the invention may be in the form of a "processing machine"

a "computing device," an "electronic device," a "mobile device," etc. These may be a computer, a computer server, a host machine, etc. As used herein, the term "processing machine," "computing device, "electronic device," or the like is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular step, steps, task, or tasks, such as those steps/tasks described above. Such a set of instructions for performing a particular task may be characterized herein as an application, computer application, program, software program, or simply software. In one aspect, the processing machine may be or include a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example. The processing machine used to implement the invention may utilize a suitable operating system, and instructions may come directly or indirectly from the operating system.

The processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further aspect of the invention, be performed by a single component. Further, the processing performed by one distinct component as described above may be performed by two distinct components. In a similar manner, the memory storage performed by two distinct memory portions as described above may, in accordance with a further aspect of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity, i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various aspects of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by a processor.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some aspects of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many aspects and adaptations of the present invention other than those herein described, as well as many variations, modifications, and equivalent arrangements, will be apparent from or reasonably suggested by the present invention and foregoing description thereof, without departing from the substance or scope of the invention.

Accordingly, while the present invention has been described here in detail in relation to its exemplary aspects, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such aspects, adaptations, variations, modifications, or equivalent arrangements.

What is claimed is:

1. A method comprising:

determining an event associated with a threshold probability of causing inaccessibility to an asset;

retrieving, by a model executed by a processor and from a database, event data, wherein the event data includes one or more of an event category, a nature, a location, a scale, a duration, a season, and a time of day;

determining, from a database of a plurality of assets, a set of assets affected by the event based on the event data;

generating, by a generative adversarial network and a probabilistic time series model, cause synthetic data related to the event for the set of assets to determine a category for the event based on a location of the event, wherein the cause synthetic data includes inputs of past event data with the same impact, time, or nature, wherein the generative adversarial network determines whether a generated event data of the cause synthetic data meets a threshold metric based on comparison to actual event data;

generating effect synthetic data related to the event for the set of assets to determine a first order impact and a second order impact;

generating a recovery strategy including a response detail based on the cause synthetic data and the effect synthetic data for each asset;

generating a risk profile associated with the generated recovery strategy including the response detail for each asset and a probability of the event; and calculating a degree of risk for the response detail.

2. The method of claim 1, wherein the effect synthetic data is generated by the generative adversarial network including inputs of a mix of the set of assets and a probabilistic time series model to determine whether the generated event data meets a threshold metric based on comparison to actual complex asset disruption data.

3. The method of claim 1, wherein the recovery strategy is generated by the generative adversarial network including inputs of the cause synthetic data and the effect synthetic data to determine whether the recovery detail meets a threshold metric of recovery of an asset of the set of assets, wherein the asset of the set of assets is impacted by the event.

4. The method of claim 1, further comprising generating, with a retrieval augment generation model, chunks based on the recovery strategy.

5. The method of claim 4, further comprising combining the chunks with a query to construct a prompt.

6. The method of claim 1, wherein generating the cause synthetic data or the effect synthetic data comprises generating a chaotic event.

7. The method of claim 5, further comprising using retrieved relevant documents as context with the prompt and the query and generating a response with a language learning model.

8. The method of claim 1, further comprising querying through a prompt systematically to recommend one or more ways for determining the response detail for the recovery strategy using a combination of parameters.

9. The method of claim 1, further comprising querying through a prompt systematically to recommend one or more ways for determining the response detail for the recovery strategy using a confidence score.

10. The method of claim 1, further comprising enacting a response by allocating an asset to the response detail.

11. The method of claim 10, further comprising, based on the allocation, contacting an asset with a task related to the response detail.

* * * * *